US005819160A

United States Patent [19]

Foladare et al.

[11] Patent Number: 5,819,160

[45] Date of Patent: Oct. 6, 1998

[54] PROGRAMMABLE RADIO SUBSCRIPTION SYSTEM FOR RECEIVING SELECTIVELY DEFINED INFORMATION

[75] Inventors: Mark Foladare, Kendall Park; Shelley Goldman, East Brunswick; David Phillip Silverman, Somerville, all of N.J.; Walter Sturm, New York, N.Y.

[73] Assignee: AT&T Corp, Middletown, N.J.

[21] Appl. No.: 715,971

[22] Filed: Sep. 18, 1996

[51] Int. Cl.[6] .................................................. H04B 7/00

[52] U.S. Cl. .......................... 455/45; 455/4.2; 455/186.1

[58] Field of Search .............................. 455/4.1, 4.2, 5.1, 455/6.3, 45, 46, 507, 517, 524, 525, 67.1, 150.1, 151.1, 152.1, 186.1, 186.2; 348/6, 7

[56] References Cited

U.S. PATENT DOCUMENTS

| | | | |
|---|---|---|---|
| 5,134,719 | 7/1992 | Mankovitz | 455/186.1 |
| 5,572,442 | 11/1996 | Schulhof et al. | 455/4.2 |
| 5,577,266 | 11/1996 | Takahisa et al. | 455/45 |

*Primary Examiner*—Thanh Cong Le

[57] ABSTRACT

The radio subscription system of the present invention enables a subscriber to remotely define and identify one or more playlists, each specifying information content selected by the subscriber from a subscription content database, for later transmission to the subscriber's radio. The radio subscription system also permits the subscriber to use the local subscriber radio to remotely request transmission of a particular playlist to the subscriber's radio for storage and playback. The subscriber may then use the local subscriber radio to play back the particular playlist.

6 Claims, 3 Drawing Sheets

PROGRAMMABLE RADIO SUBSCRIPTION SYSTEM FOR RECEIVING SELECTIVELY DEFINED INFORMATION

BACKGROUND OF THE INVENTION

1. Field of the Invention

The present invention relates to a digital radio operable for receiving digital radio broadcasts. More particularly, the present invention is directed to an arrangement by which a subscriber determines and defines the content of digital radio broadcasts to be received by the subscriber by choosing from content stored in a database of such content.

2. Description of the Related Art

A typical radio is a device capable of receiving entertainment and news programming broadcast by one or more radio stations within the reception range of the radio. Each radio station commonly broadcasts a variety of programming with a predetermined schedule. For example, most radio stations include news as a part of their morning and afternoon broadcasts. Typically, radio stations are dedicated to one or more general or specific areas of interest. For example, some radio stations are dedicated to providing only news twenty-four hours a day, while other radio stations are dedicated to broadcasting a particular type of music, such as classical or rock-and-roll music. In large metropolitan areas, a large variety of radio stations catering to a wide range of interests typically co-exist. A radio listener, however, has little or no control over the content of the broadcasts. In order to tailor their programming to listener needs, many radio stations have implemented a music request service, where a listener may call a designated telephone number and request that a particular selection be played by the radio station. This approach is problematic, however, in a number of ways. First, it is often difficult and inconvenient to contact the radio station due to the large number of listeners calling in to request selections. Second, the listener may not be able to contact the radio station, if for example, the listener is traveling in a car. Third, the listener has no control over when the requested selection will be played; requested selections are generally simply placed in a queue in the order in which they have been received. Thus a listener may request a selection that might not be played until a much later time, long after the request has been made.

Unlike requesting music selections, radio listeners have no control over the selection of content for news programs broadcast by radio stations. Often, if the listener desires to hear news about a particular event or related to a particular topic, the listener must manually scan and monitor numerous radio broadcasts in an effort to locate the desired news information. This problem is exacerbated if the listener is traveling outside of the range of radio stations local to the listeners residence. In such a situation the traveling listener may have access only to local news of the area through which the listener is traveling, which may be of little or no interest. Furthermore, some audio information, such as audio literary works, is simply not available in radio broadcast format.

It would thus be desirable to enable a radio listener to selectively predefine the content or subject matter of broadcasts being transmitted directly to or receivable by the listener's radio. It would further be desirable to enable the listener to select a particular predefined broadcast to be transmitted to the listener's radio for playback or receipt.

SUMMARY OF THE INVENTION

The disadvantages and limitations discussed above are overcome by the present invention. The radio subscription system of the invention enables a subscriber to remotely define and identify one or more playlists, each playlist having information content selected by the subscriber from a subscription content database, for later transmission to the subscriber's radio. The radio subscription system also enables the subscriber to remotely request transmission of a particular playlist to the subscriber's radio for playback.

The present invention includes a subscription control system having a main control unit for controlling the operation of the subscription control system and operable for remotely interacting with a subscriber and for wireless digital communication with one or more digital radios, a subscription content database for storing audio information for selection by the subscriber, and a subscriber data memory for storing data representative of one or more unique subscribers and data representative of one or more playlists associated with each unique subscriber. The present invention also includes a digital radio having a radio control unit for controlling the operation of the digital radio and operable for wireless digital communication with the subscription control system, a data input device for entering data for transmission to the subscription control system, a data storage device for storing transmissions received from the subscription control system prior to playback, and an audio output device for playback of transmissions stored in the data storage device.

In accordance with the present invention a subscriber remotely connects to a subscription control system to selectively define or edit one or more playlists. A playlist is a collection of one or more items of audio information such as music selections, news stories, and literary audio works. The remote connection is preferably accomplished via a data network, such as the Internet, in which the subscriber uses a computer equipped with a modem to interact with the subscription control system. The remote connection may also be accomplished via a voice telephone network, in which case the subscriber uses a touch-tone telephone or the like to interact with the subscription control system.

Once connected to the subscription control system, the subscriber transmits a unique subscriber identification (ID) code, thus identifying that subscriber to the subscription control system. The subscriber then identifies a new playlist with a unique playlist identification (ID) code and selects the playlist content from the subscription content database. The subscription content database preferably contains a large number of music selections organized and cross referenced by selection name, performing artist and music genre so that each selection may be readily located by the subscriber. The subscription content database also preferably contains a large number of audio literary works organized by title, author, and/or subject matter or topic. The volume or number of music selections and audio literary works stored in the subscription content database is limited only by the storage capacity of the database.

If the subscriber desires to include news selections as part of a playlist being defined, the subscriber may select one or more predefined keywords from the subscription content database to identify a news topic for inclusion in the playlist. For example, the subscriber may select the keyword "BASEBALL" if news about baseball is desired or "NEWS: FRANCE" if the subscriber is interested in news relating to France. Optionally, the subscriber may directly key-in or enter one or more new keywords to identify a particular news topic in lieu of selecting an existing keyword. When the playlist is complete, the playlist ID code is associated with the subscriber ID code, and the playlist is stored in subscriber data memory. The subscriber may then define another playlist, edit the content of an existing playlist or delete an existing playlist.

At any time after a subscriber has at least one playlist stored in the subscriber data memory, the subscriber may remotely retrieve a particular playlist by transmitting the subscriber and playlist ID codes from the digital radio to the subscription control system. Once the subscriber and playlist ID codes are received, the main control unit matches the received subscriber ID code to the subscriber ID code stored in subscriber data memory, and selects the playlist in accordance with the received playlist ID code. The main control unit then assembles the playlist from the subscription control database in accordance with its predefined content. If news selections are included in the playlist, the main control unit connects to a captioned news service to retrieve news selections in accordance with one or more keywords defined in the playlist. The completed playlist is then transmitted to the digital radio and stored in the data storage device for later playback by the audio output device. Optionally, the playlist may be immediately played back as it is received from the subscription control system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENT

Figure 1:
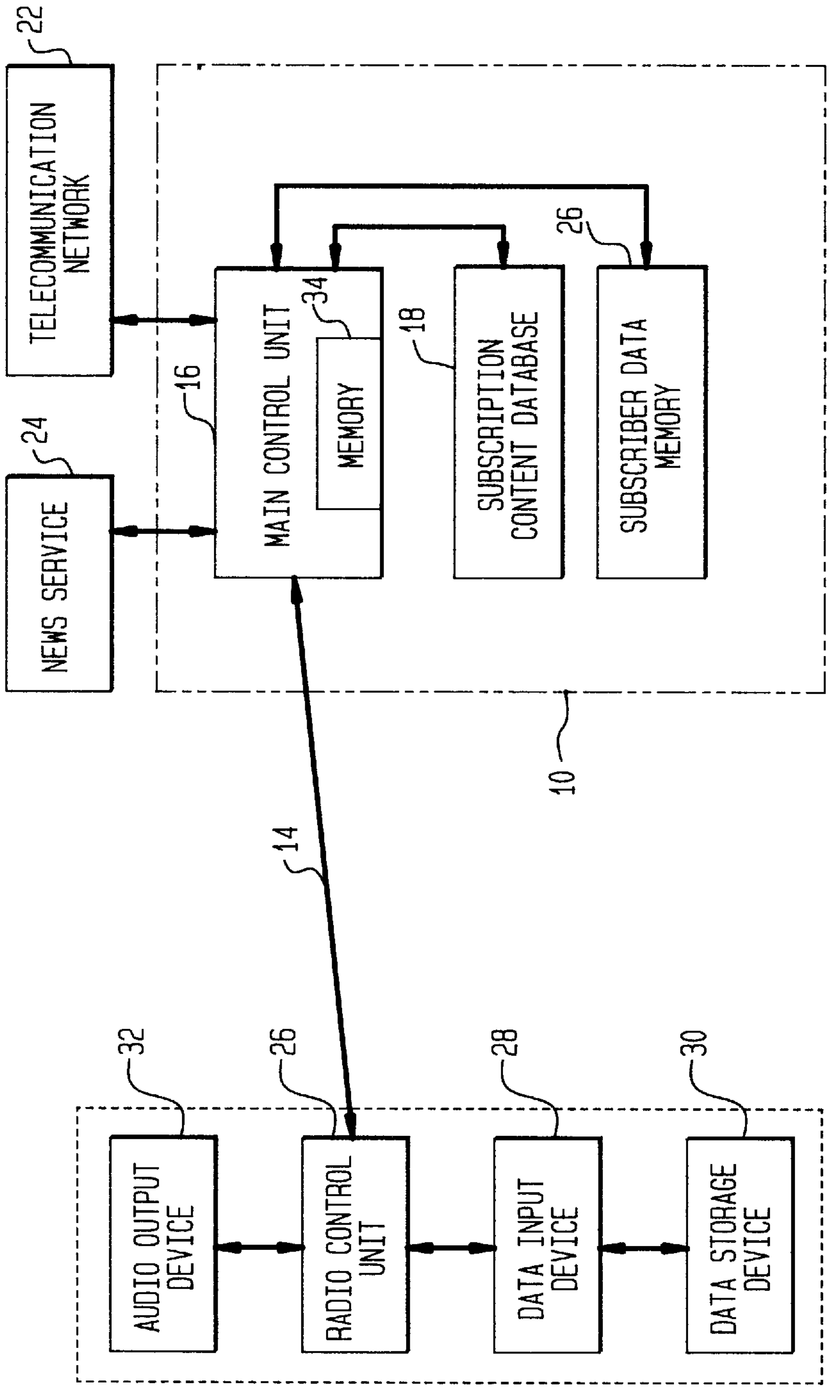
FIG. 1 is a schematic block diagram of a radio subscription system for defining the content of digital radio broadcasts for selective reception by a subscriber's digital radio in accordance with the present invention.

Although the present invention is described with reference to a specific embodiment of a radio subscription system, it should be understood that the radio subscription system of the present invention may be readily adapted for selectively defining the content of video or other forms of broadcasts. For example, a playlist may include video selections such as music videos and/or movies and a digital radio may be equipped with a video output device for playback or receipt of video playlists. All such variations are intended to be included within the scope of the present invention. It will also be recognized and appreciated that, in the drawings, wireless transmission and receiving devices are not shown in detail as such devices are well-known and are commonly used in conjunction with radio receiving and broadcast systems.

Referring now to the drawings, and initially to FIG. 1 thereof, a subscription control system 10 is shown. The subscription control system 10 is preferably connected to at least one digital radio 12 via a wireless digital communication link 14. The communication link 14 is preferably implemented in a cellular communication network, but may alternatively be any wireless (or wired) data communication medium. The subscription control system 10 includes a main control unit 16 for controlling the operation of the subscription control system 10. The main control unit 16 is preferably a computer system and associated components configured for manipulating and transmitting digital audio data. The main control unit 16 thus includes or interfaces with a digital radio transmitter and receiver (not shown) for transmitting and receiving data via the communication link 14. The main control unit 16 also includes a telecommunication device connected to a telecommunication network 22 for interactively communicating with a subscriber and an interactive interface. The telecommunication device of the control unit 16 is preferably a modem to which the subscriber may connect using a local (to the subscriber) computer system also equipped with a modem (not shown) and the interactive interface is preferably a graphical user interface such as an Internet World Wide Web page. The telecommunication device may also alternatively be a touch tone telephone or the like with an interactive audio menu interface. The interactive communication between the subscriber and the main control unit is described in greater detail below in conjunction with FIG. 2.

The subscription control system 10 also includes a subscription content database 18 for storing audio information for selection by the subscriber and for storing one or more keywords corresponding, by way of example, to one or more news topics. The audio information stored in the subscription content database 18 preferably includes, but is not limited to, music selections organized and cross-referenced by selection name, performing artist and music genre, audio literary works organized by topic, title and author, and educational and self-help selections organized by topic, title, and author. The volume and number of music and educational selections and audio literary works stored in the subscription content database 18 is limited only by the storage capacity of the database. The main control unit 16 is preferably connected to a captioned news service 24, so that particular audio news selections may be selectively retrieved by topic using one or more keywords stored in the subscription content database 18.

The subscription control system 10 further includes a subscriber data memory 20 for storing data identifying one or more unique subscribers and data representative of one or more playlists each associated with a particular subscriber and corresponding to audio information from the subscription content database 18 and/or news information from the news service 24 that has been marked for later retrieval by that subscriber.

The digital radio 12—which will normally be located "locally" at the subscriber's premises or site, or listening location—includes a radio control unit 26 for controlling the operation of the digital radio 12. The digital radio 12 may be a portable radio, a vehicle radio, or a rack stereo component. The radio control unit 26 is preferably a microprocessor-based device configured for receiving and processing digital audio data and for transmitting non-audio digital data. The radio control unit 26 also includes, or is associated with, a digital radio receiver and transmitter (not shown) for receiving digital audio data and for transmitting digital non-audio data via the communication link 14.

The digital radio 12 also includes a data input device 28 for accommodating subscriber entry of non-audio digital data for transmission to the main control unit 16. The data input device 28 is preferably an alphanumeric keypad, but may also be a voice recognition system for receiving and interpreting voice information. A data storage device 30 is provided for storing digital audio data received from the main control unit 16 prior to playback; the data storage device 30 is preferably a computer memory for storing digital audio data. An audio output device 32 is also provided for playback of digital audio data stored in the data storage device 32. The audio output device 32 is preferably one or more audio speakers and suitable amplification apparatus, but may also be a set of headphones.

While only a single digital radio 12 is shown in FIG. 1, it should be understood that more than one digital radio can be connected to the subscription control system 10 via each communication link 14. As a practical matter, the maximum number of digital radios which may be simultaneously connected to the subscription control system 10 is limited only by the bandwidth of the communication link 14 and the processing power and throughput of the main control unit 16.

Figure 2:
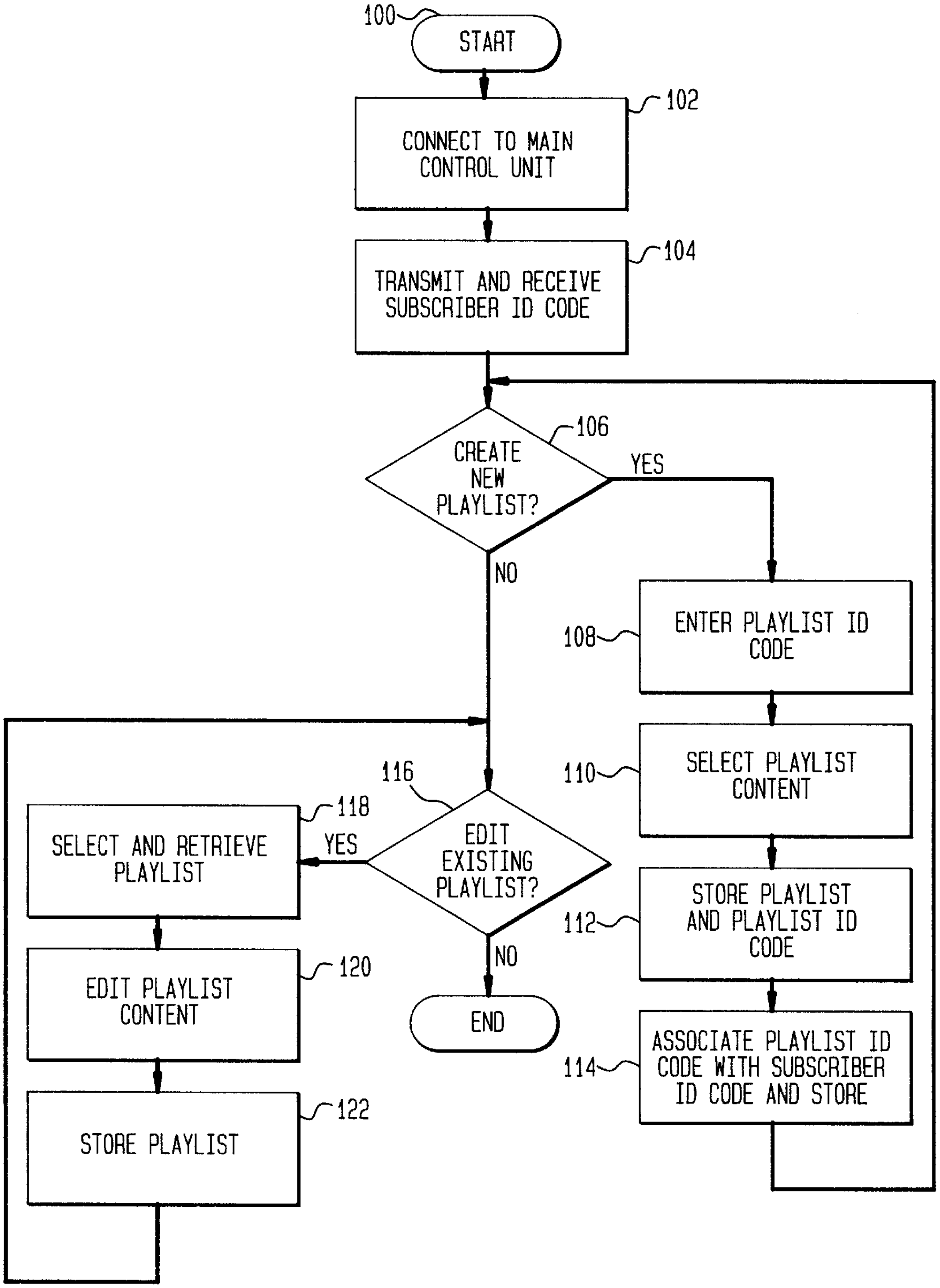
FIGS. 2 and 3 are logic flow diagrams depicting the functional operation of the system of FIG. 1 in accordance with the present invention.
Figure 3:
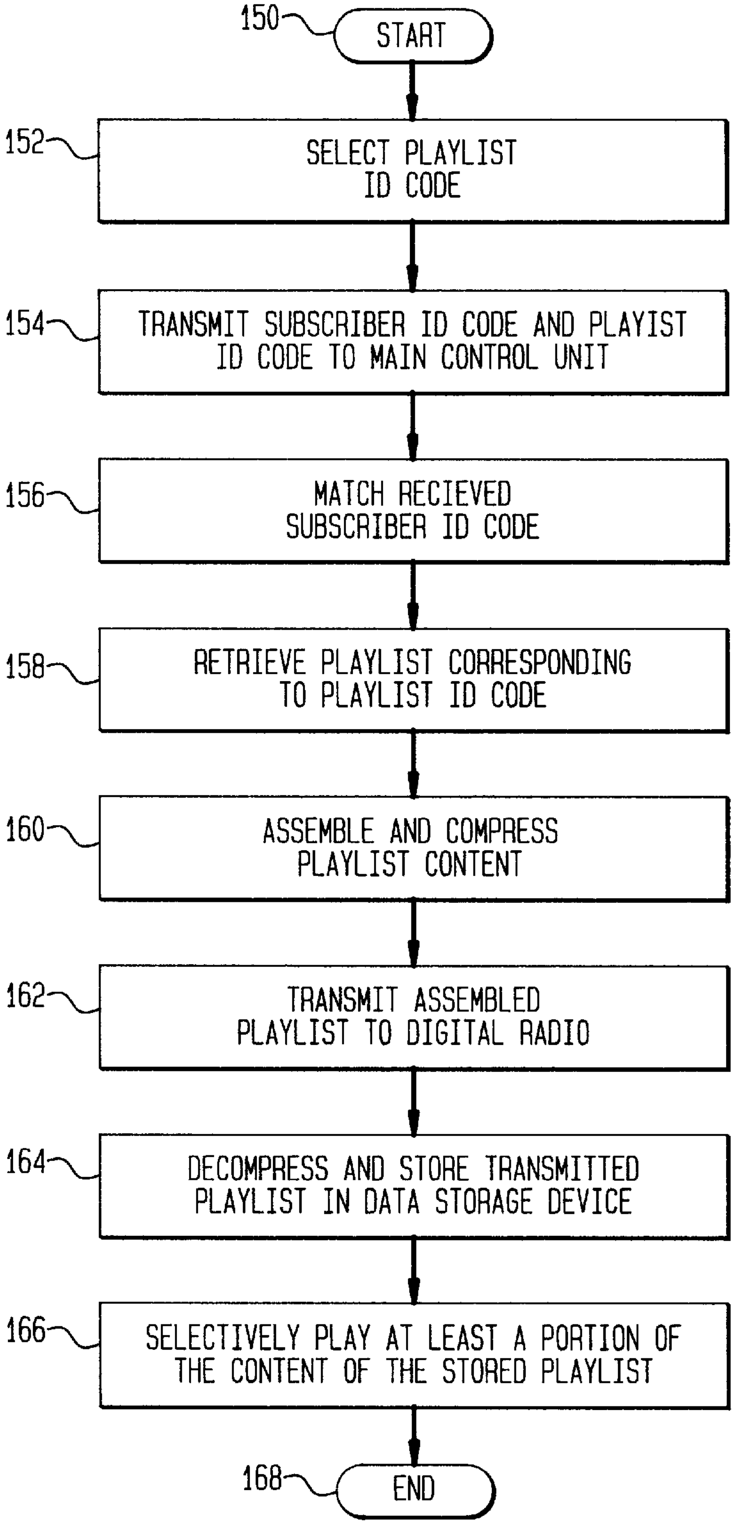

The operation of the system of the present invention is generally controlled by a control program stored in a memory 34 of the main control unit 16, and executed through operation of the main control unit. This control program may by way of example consist of multiple integrated program modules, with each module bearing responsibility for operatively controlling one or more functions of the control unit 16. For example, one program module may control the creation of a playlist by a subscriber remotely connected to the main control unit, while another program module may control the assembly of a particular playlist for transmission to a particular subscriber. In effect, each program module is a control program dedicated to a specific function or set of functions of the main control unit 16. Two main modules of the control program of the present invention are described below in connection with FIGS. 2 and 3. The first program module, described in FIG. 2, is executed by the main control unit 16 and controls the configuration of new playlists and the editing of existing playlists by a subscriber remotely connected to the main control unit 16. The second program module, described in FIG. 3, is executed by the main control unit 16 and the radio control unit 26, and controls the assembly, transmission, and playback of a requested playlist to a subscriber.

Referring now to FIG. 2, the first program module starts its operation at step 100 and proceeds to step 102 where the subscriber connects to the main control unit 16 user interface via the telecommunication link 14 and network 22. As described above, the user interface is preferably a graphical interface which enables the subscriber to visually interact with the main control unit 16. The subscriber then transmits a subscriber identification (ID) code which is received by the main control unit 16 at step 104. The subscriber ID code is a code unique to each subscriber and is assigned by the system when a subscriber subscribes to the system of the present invention, for identifying the particular subscriber to the main control unit 16. At test 106 the subscriber is prompted whether a new playlist is to be created. If a new playlist is to be created, the main control unit 16, proceeds to step 108 where the subscriber enters a playlist identification (ID) code to identify the particular playlist being created. Preferably, the playlist ID code is representative of the playlist content. For example, a playlist having classical music selections from Mozart may be assigned a playlist ID code of "MOZART". Optionally, the playlist ID code may be a set of numbers or other characters selected by the subscriber and unrelated to playlist content. At step 110 the subscriber selects the playlist content from the subscription content database 18. A particular playlist may consist of purely musical selections, audio literary works, educational selections, news keywords or any combination thereof. For example, one playlist may contain three classical music selections and an audio short story, while another playlist may contain eight rock music selections and a BASEBALL news keyword. Optionally, the user may key-in or enter for the playlist a new keyword that is not already present in the subscription content database 18. A keyword preferably defines a news selection of a predetermined length, such as 5 or 10 minutes of news. Optionally, the system may include a set of pre-defined playlists having predetermined playlist ID codes arranged by topic, artist, or genre for selection by subscribers. For example, a system-defined playlist may include the top ten rock and roll songs of the week. The subscriber may thus select one or more predefined playlists at step 110 in lieu of or in addition to creating a subscriber-defined playlist.

The permitted size of each playlist is predefined by the main control unit 16 and is generally proportional to the processing capability of the main control unit 16 and the storage capacity of the data storage device 30. The content of the actual selections that are stored in the subscription content database 18 are not retrieved or made a part of the playlist at this stage—only data representative of or identifying the selections made by the subscriber is actually stored. Thus, a playlist may simply contain four numerical codes representative of or identifying four user-selected classical music passages or pieces that are stored in the subscription content database 18. This approach is preferred because unnecessary duplication of stored audio data is thereby avoided.

At step 114 the playlist ID code of the newly completed playlist is associated with the subscriber's unique ID code and is stored in the subscriber data memory 20. Thus, a particular subscriber ID code may have, at any given time, one or more associated playlists. The main control unit 16 then returns to test 106 to determine whether any more playlists are to be created at this time.

If no new playlists are to be created at test 106, the main control unit 16 proceeds to test 116 where the subscriber is prompted whether any existing playlists are to be edited. If an existing playlist is to be edited at step 118 then the subscriber selects a playlist to be edited from a group of existing playlists associated with that subscriber's subscriber ID code. The selected playlist is then retrieved from the subscriber data memory 20 by main control unit 16. At step 120, the subscriber edits the selected playlist by removing or modifying selections and/or news keywords defined in the playlist and/or by adding new selections and/or news keywords that are, for example, retrieved from the subscription content database 18. The subscriber may also delete the selected playlist at step 120. At step 122, the updated playlist is stored in the subscriber data memory 20 and main control unit 16 returns to test 116 and prompts the subscriber as to whether another existing playlist is to be edited. If no playlists are to be edited at test 116, then the main control unit 16 ends the first program module at step 118. Thus, the first program module enables a subscriber to remotely define and select content of one or more playlists for transmission to the subscriber's digital radio 12.

Referring now to FIG. 3, the second program module starts its operation at step 150 and proceeds to step 152 where the subscriber selects an existing playlist ID code using the data input device 28. At step 154 the radio control unit 26 transmits the subscriber ID code and the selected playlist ID code to main control unit 16. At step 156, the main control unit matches the received subscriber ID code to the subscriber ID codes stored in the subscriber data memory 20 and, at step 158, retrieves the playlist corresponding to the received playlist ID code. At step 160, the main control unit 16 assembles the playlist by retrieving appropriate selections from the subscription content database 18 and from the news service 24 if any keywords are present in the playlist. The assembled playlist is then preferably compressed to reduce the size of the playlist during data transmission. At step 162 the assembled playlist is transmitted from main control unit 16 to the subscriber's radio control unit 26 via the communication link 14. At step 164, the received playlist is decompressed and stored in the subscriber's data storage device 30 for later playback. At step 166, the subscriber may selectively play all or a portion of the stored playlist. If the processing power of the radio control unit 26 is sufficient, the playlist may optionally be decompressed and played back as it is being received from the main control unit 16. The main control unit 16 then ends the second program module at step 168. Thus, the second program module enables a subscriber to selectively remotely receive a playlist defined by the subscriber using the first program module of FIG. 2.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A programmable radio subscription system having a predetermined audio data content set, for use with a wireless communication network by a subscriber, comprising:

configuration means operable to define and configure at least one playlist identifying audio data content selected by the subscriber from the predetermined audio data content set, each said playlist having a predefined unique identifier code, said configuration means further comprising means operable to define, within said at least one playlist, a selection criteria for automatically selecting audio data from the predetermined audio data content set;

first memory means, connected to said configuration means, for storing said at least one playlist;

second memory means for storing audio data content selectable by the subscriber for identification in said at least one playlist;

first selection means, connected to said first memory means via the wireless communication network, and operable for remotely selecting a particular playlist stored in said first memory means from said at least one playlist in accordance with the predefined unique identifier code of said particular playlist;

retrieving means, connected to said first selection means, and operable for remotely retrieving said selected particular playlist from said first memory means, and for retrieving from said second memory means the audio data content identified in said particular playlist and automatically selected at least in part in accordance with said selection criteria in response to a subscriber request to play the audio data content identified in said particular playlist; and audio output means for playing the retrieved selected audio data content identified in said selected particular playlist to the subscriber.

2. The programmable radio subscription system of claim 1 further comprising third memory means, connected to said retrieving means, for storing the selected audio data content identified in said particular playlist retrieved by said retrieving means, wherein said audio output means is operable for selectively playing at least a portion of the selected audio data content identified in said particular playlist stored in said third memory means.

3. The programmable radio subscription system of claim 1, wherein said configuration means further comprise means for selecting at least one playlist identifying audio data content automatically selected by the radio subscription system.

4. The programmable radio subscription system of claim 1 wherein the audio data content is at least one of; music, audio literature, and news.

5. The programmable radio subscription system of claim 1 further comprising audio data compression means, connected to said retrieving means, for compressing the selected audio data content identified in said particular playlist, during the retrieval, and for decompressing the selected audio data content identified in said particular playlist prior to playback by said audio output means.

6. A programmable radio subscription system, having a predetermined audio data content set, for use by a subscriber, comprising:

a wireless communication network;

configuration means operable to define and configure at least one playlist identifying audio data content selected by the subscriber from the predetermined audio data content set, each said playlist having a predefined unique identifier code, said configuration means further comprising means operable to define, within said at least one playlist, a selection criteria for automatically selecting audio data from the predetermined audio data content set;

first memory means, connected to said configuration means, for storing said at least one playlist;

second memory means for storing audio data content selectable by the subscriber for identification in said at least one playlist;

first selection means, connected to said first memory means via the wireless communication network, and operable for remotely selecting a particular playlist stored in said first memory means from said at least one playlist in accordance with the predetermined unique identifier code of said particular playlist;

retrieving means, connected to said first selection means, and operable for remotely retrieving said selected particular playlist from said first memory means and for retrieving from said second memory means the audio data content identified in said particular playlist and automatically selected at least in part in accordance with said selection criteria in response to a subscriber request to play the audio data content identified in said particular playlist; and audio output means for playing the retrieved selected audio data content identified in said selected particular playlist to the subscriber.

* * * * *